United States Patent

[11] 3,581,169

| [72] | Inventors | Romeo T. Calud<br>Rockford, Ill.;<br>David L. Hansbrough, South Milwaukee, Wis.; Dean R. Zaumseil, Rockford, Ill. |
|---|---|---|
| [21] | Appl. No. | 829,449 |
| [22] | Filed | June 2, 1969 |
| [45] | Patented | May 25, 1971 |
| [73] | Assignee | Bucyrus-Erie Company<br>Milwaukee, Wis. |

[54] REVERSING CONTROL FOR AN INDUCTION MOTOR
9 Claims, 2 Drawing Figs.

| [52] | U.S. Cl. | 318/214, 318/243 |
|---|---|---|
| [51] | Int. Cl. | H02k 17/02 |
| [50] | Field of Search | 318/214, 243 |

[56] References Cited
UNITED STATES PATENTS
3,383,576  5/1968  Kordik .................. 318/214

*Primary Examiner*—Oris L. Rader
*Assistant Examiner*—K. L. Crosson
*Attorneys*—Thomas O. Kloehn, Arthur H. Seidel and Ray G. Olander

ABSTRACT: An induction motor with two equal stator segments, one being rotatably adjustable, has an electrical actuator mounted on it and controlled by a feedback control system to position the rotatably adjustable stator segment. A speed control potentiometer is ganged for operation with a master switch, which can energize either of two relays to connect the stator across a powerline for forward or reverse rotation. A limit switch is actuated by the rotationably adjustable stator segment to override the control by the master switch of the relays throughout a predetermined range of stator segment positions.

INVENTORS
ROMEO T. CALUD
DAVID L. HANSBROUGH
DEAN R. ZAUMSEIL

BY Thomas O. Kloehn

ATTORNEY

REVERSING CONTROL FOR AN INDUCTION MOTOR

BACKGROUND OF THE INVENTION

The present invention relates to the control of dual stator drive motors generally. The dual stator drive motor is basically an induction motor, but its stator is formed in two, equal segments, either one or both of which may be rotatably adjustable through about 90° so that the phase relationship of the currents in the two stator segments can be adjusted with respect to one another for continuous precise control of the torque and speed of the motor. Dual stator drive motors, generally are well known to the art as evidenced by three patents to Roe, Nos. 3,280,400; 3,280,928; and 3,290,574 which have issued within the last few years, as well as the ancient patents to Gorges, No. 547,069 and to Meuschel, No. 727,662. Most recently, U.S. Pat. No. 3,383,578 to Kordik illustrates a motor very similar to the dual stator motor shown here.

The Roe prior art would suggest that such motors should be started and reversed only in the null phase relationship of the stator windings, but subsequent development has obviated that restriction. Nevertheless, where the adjustment of the stator segments is effected with a power actuator and controlled by an operator in a remote location, it is desirable to have some automatic means for actuating the reversing contacts within a predetermined segment of the torque range of the particular motor in the particular installation. Also some means are desired to return the stators to the predetermined segment of the torque curve of the motor whenever the motor is turned off, so that when it is started again, the stators will be within the predetermined segment of the torque curve.

SUMMARY OF THE INVENTION

The present invention relates to a remote reversing control for a dual stator induction motor; and more specifically, the invention resides in the combination of an induction motor having two relatively rotatably adjustable stator segments, a master switch controlled by an operator for actuating line contacts to control current paths between the motor stator and an AC source, and an override switch actuated by the rotary adjustment of said stator segments to isolate the line contacts from control by the master switch when the adjustable stator segments are within a predetermined range of rotary adjustment.

By the foregoing combination, a remote reversing control is provided for dual stator motors whereby the motor can be reversed only when the stator segments are within a predetermined segment of the torque curve. By adding to that combination an actuator responsive to a control signal proportional to the algebraic sum of an operator control command signal and a stator position feedback signal, the further advantage of ensuring the return of the stator to the predetermined segment of the torque curve when the motor is turned off is assured. Since the present invention prevents the motor from being started or reversed outside of the predetermined segment of the torque curve, the motor and associated equipment may be protected against mechanical shock, the motor may be protected against excessive starting currents, and these objectives may be accomplished entirely automatically without any activity by the operator. Moreover the motor may be made insensitive to rapid plugging by the operator so that it will respond only to the final sustained position of the operator's control member for the actuation of reversing contacts.

DESCRIPTION OF THE PREFERRED EMBODIMENTS

Figure 1:
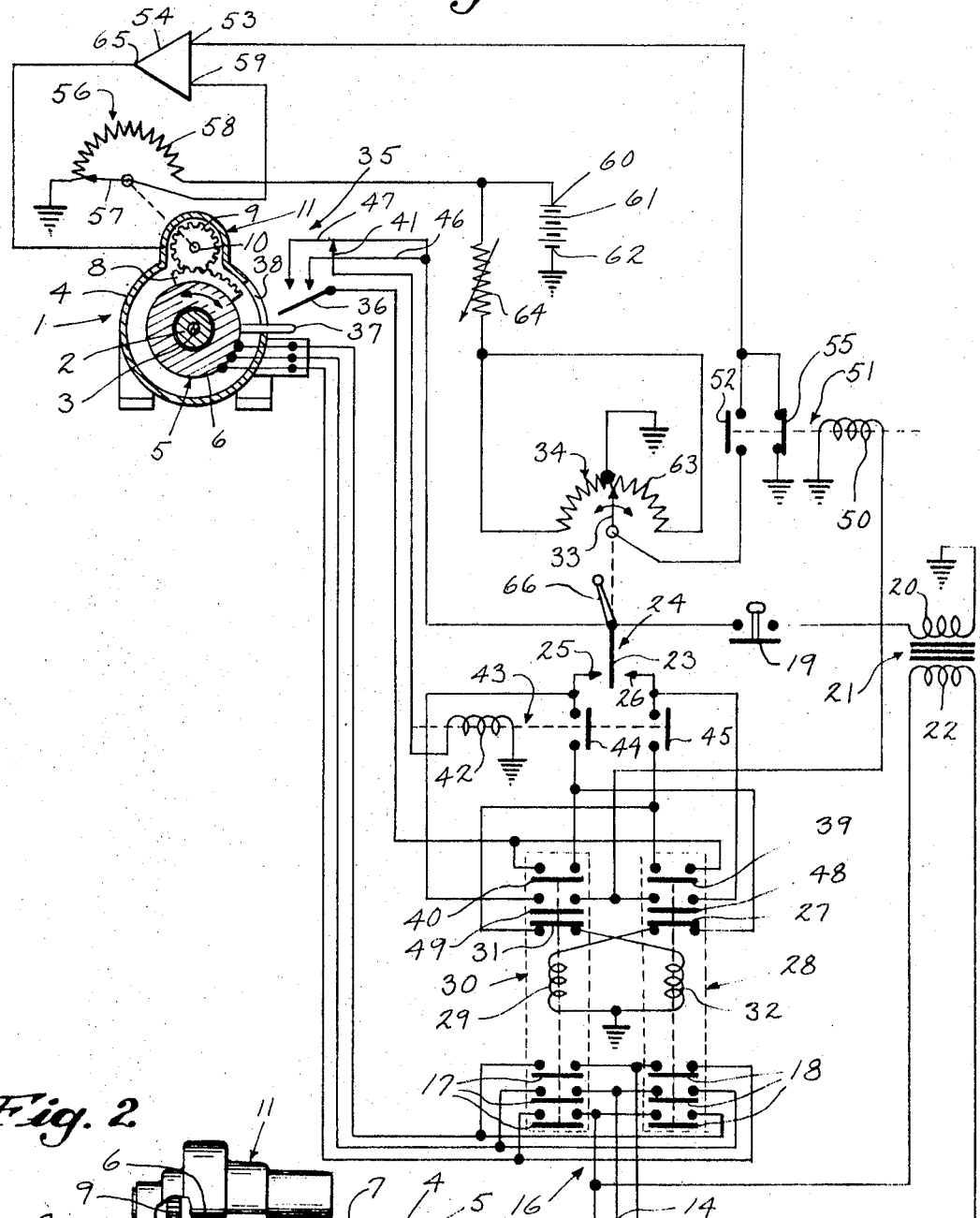
FIG. 1 is a schematic diagram of a control circuit embodying the present invention in conjunction with a dual stator drive motor.
Figure 2:
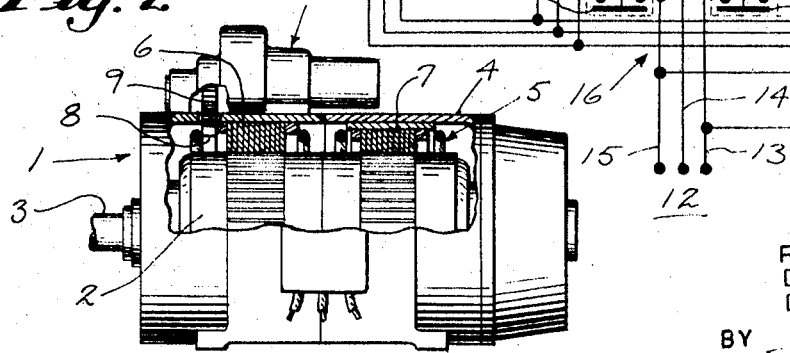
FIG. 2 is a side view in elevation of a dual stator drive motor illustrating the two stator segments acting on the single rotor.

A dual stator drive motor 1 is shown in both FIGS. 1 and 2, and the latter shows that the motor 1 has a single rotor 2 mounted on a shaft 3 that is rotatably supported by a motor frame 4. The motor 1 has a stator 5 in the form of two, separate, equal stator segments 6 and 7, which are relatively rotatably adjustable with respect to one another. The relative rotatable adjustment of the stator segments 6 and 7 is achieved by mounting one of the stator segments 7 in fixed relationship to the motor frame 4, and by mounting the other stator segment 6 for limited rotary movement in the motor frame 4. The adjustable or movable stator segment 6 has an arcuate gear segment 8 mounted on it that is engaged by a pinion 9 mounted on a drive shaft 10 of a rotary actuator 11. The rotary actuator 11 may be an electric motor, which it is in this case, or it may be a hydraulic motor, or the rotary actuator could be replaced by a hydraulic cylinder or some other equivalent device.

Since the dual stator motor 1 is essentially an induction motor, the stator 5 is connected to a three-phase AC source 12, illustrated in the drawing as power lines 13, 14 and 15. The torque and hence the speed of the motor 1 is controlled by varying the position of the movable or rotatably adjustable stator segment 6. When the stator segments 6 and 7 are in phase alignment, the motor 1 operates at rated speed, substantially the same as any induction motor, but as the movable stator segment 6 is rotatably adjusted out of phase alignment with the fixed stator segment 7, the two stator segments 6 and 7 induce voltages in the rotor 2 that are to a greater or lesser extent in phase opposition so that the torque and hence the speed of the motor 1 is reduced. The torque and speed control of such a motor is thus a continuous control from full rated torque and speed, when the stator segments 6 and 7 are in phase alignment, to virtually zero torque and speed when the stator segments 6 and 7 are out of phase by 180 electrical degrees.

The direction of the rotation set the rotor 2 is controlled by means of a reversing contactor 16 that is connected in series between the lines 13, 14 and 15 and the stator 5. The reversing contactor 16 consists of a set of three contacts 17, which may be termed forward contacts 17 and another set of three contacts 18, which may be termed reverse contacts 18. As a brief examination of the drawings will reveal, the effect of alternately opening and closing either the forward contact 17 or the reverse contacts 18 is to reverse the phase relationship of the AC power to the stator 5. Since the direction of rotation of the rotor 2 depends upon the phase relationship of the AC power, the need for multiphase power is evident, and three-phase power as shown in the drawings is most convenient and efficient.

As illustrated in FIG. 1, the entire circuit and the motor 1 is deenergized and all contacts are in their normal condition, except a stop button 19, which is normally closed, but which is shown open here to illustrate the rest of the circuit in its deenergized state. The circuit is energized by allowing the push button 19 to return to its normally closed state, since the push button 19 is connected to the secondary 20 of a control transformer 21, the primary 22 of which is connected across the AC source 12. The end of the secondary 20 opposite the push button 19 is grounded to a common ground return.

A movable contact 23 on a master switch 24 is connected through the push button 19 to the secondary 20 of the control transformer 21 to be energized thereby. The master switch 24 has a forward fixed contact 25 and a reverse fixed contact 26. The forward fixed contact 25 is connected through normally open contacts 49 of a forward contactor 30 to one terminal of a coil 50 of a command disconnect relay 51, and it is also connected through the normally open contact 45 of the relay 43 and the normally closed contact 27 of reverse contactor 28 to one terminal of coil 29 of forward contactor 30. The reverse fixed contact 26 is connected through normally open contacts 48 of the reverse contactor 28 to one terminal of the coil 50 of the disconnect relay 51. The other terminal of the coil 50 of the disconnect relay 51 is connected through normally open contact 45 of relay 43 and normally closed contact 31 of forward contactor 30 to one terminal of contactor coil 32. Both contactor coils 29 and 32 having opposite ends connected to a common ground return. The movable contact 23 of the master switch 24 is ganged with a sliding contact 33 of a speed control potentiometer 34 to be simultaneously controlled by an operator, with a single control handle 66.

The reversing control system of this embodiment of the invention is made up in part of the master switch 24 and, in part, of an override limit switch 35 which has make-before-break contacts with a built-in overlap. The override limit switch 35 has a movable contact 36 that is positioned in the path of an arm 37 mounted on the movable stator to project therefrom out through a slot 38 in the motor frame 4. Thus when the movable stator 6 rotates, the arm 37 engages the movable contact 36 of the override limit switch 35. The movable contact 36 of the override limit switch 35 is connected through normally open holding contacts 39 and 40 of the reverse contactor 28 and forward contactor 30, respectively, and isolation relay 43 contacts 45 and 44, respectively, to the reverse fixed contact 26 and the forward fixed contact 25 of the master switch 24. A fixed override contact 41 of the override limit switch 35 is normally closed to a movable contact 47 of the override limit switch 35, and the override contact 41 is connected to a coil 42 of a master switch isolation relay 43, which has two normally open contacts 44 and 45 connected in series with the fixed contacts 24 and 25, respectively, of the master switch 24. An overlap contact 46 of the override limit switch 35 is mounted adjacent to the movable contact 47 for successive engagement with the movable contacts 36 to achieve an overlap action as well as a make-before-break operation. The disconnect contact 47 is the second contact to be engaged by the movable contact 36 and is disconnected from the fixed override contact 41 by the action of the movable contact 36 as the arm 37 of the movable stator segments 6 moves through its cycle. The overlap and disconnect contacts 46 and 47 are connected in common through the push bottom 19 to the secondary 20 of the control transformer 21.

The command signal disconnect relay 51 has a normally open contact 52 connected in series between the sliding contact 33 of the speed control potentiometer 34 and one input terminal 53 of an operational amplifier 54 which serves as a summing circuit. The command signal disconnect relay 51 also has a normally closed contact 55 connected between ground and the input terminal 53 of the operational amplifier 54.

A feedback potentiometer 56 has its sliding contact 57 mechanically connected to the rotary actuator 11 to be positioned on a resistance element 58 of the potentiometer 56 corresponding to the position of the adjustable stator segment 6. The sliding contact 57 is electrically connected to another input terminal 59 of the operational amplifier 54, and the resistance element 58 is connected between ground on one end and a positive terminal 60 of a DC source 61, the negative terminal of which is also grounded. Hence, the electrical signal on the sliding contact 57 to the input terminal 59 of the operational amplifier 54 will be proportional to the position of the movable stator segment 6 and thus provide feedback signal to the operational amplifier 54. The speed control potentiometer 34 also has a resistance element 63, but it is grounded at its center and it has its ends connected in common through a variable resistance 64 to the positive terminal 60 of the DC source 61.

Hence, the electrical signal taken from the sliding contact 33 of the speed control potentiometer 34 will have a magnitude proportional to the desired speed of the rotor 2, and this signal is indicative of the magnitude of what is called the command signal. The signal that indicates the desired direction of rotation of rotor 2 comes from the closure of movable contact 23 on master switch 24 with either stationary contact 25 or 26. The command signal from the speed control potentiometer 34 and the feedback signal from the feedback potentiometer 56 are algebraically added in the operational amplifier 54, which puts out a control signal at its output 65 that is proportional to the algebraic sum of the command signal and the feedback signal. The output 65 of operational amplifier 54 is connected to the rotary actuator 11 to control the operation of the rotary actuator 11 and thus to control the position of the movable segment 6 of the stator 5.

When the push bottom 19 is closed, the coil 42 of the master switch disconnect relay 43 is energized through the normally closed override and disconnect contacts 41 and 47 of the override limit switch 35, closing the normally open contacts 44 and 45 of the disconnect relay 43. To start the motor 1 in the forward direction, the operator moves the handle 66 of the ganged sliding contact 33 of the speed control potentiometer 34 and movable contact 23 of the master switch 24 in the forward direction causing the movable contact 23 to engage the forward stationary contact of the master switch 24. Thus control current flows from the control transformer 21 through the master switch 24 and the normally closed contact 27 of the reverse contactor 28 to energize the coil 29 of the forward contactor 30. With the forward contactor 30 energized, its three forward line contacts 17 close, energizing the stator 5 of the motor 1, but since the movable stator segment 6 is 180° out of phase alignment with the stationary stator segment 7 (the stator segments 6 and 7 are thus in the null phase) the currents induced in the rotor 2 from the two stator segments 6 and 7 oppose and cancel one another so that little or no torque is generated.

However, meanwhile, the normally open control contacts 40 and 49 of the forward contactor 30 close and the normally closed contact 31 opens. When the normally open control contact 49 of the forward contactor 30 closes, it completes a circuit from the control transformer 21 to the common signal disconnect relay 51 energizing its coil 50 to close its normally open contact 52 and open its normally closed contact 55. This completes a circuit for a command signal from the sliding contact 33 of the speed control potentiometer 34 to the input terminal 53 of the operational amplifier 54, and since no feedback signal appears from the feedback potentiometer 56, the control signal output of the operational amplifier 54 at its output terminal 65 tends to drive the rotary actuator 11 to move the movable stator segment 6 away from the null phase position to accelerate the motor.

As the movable stator segment 6 is rotatably adjusted by the actuator 11, the arm 37 projecting from it engages the movable contact 36 on the override limit switch 35 driving it upwardly until it engages the overlap contact 46, which completes the circuit through the closed holding contacts, 40 of the forward contactor to prevent the deenergization of the coil 29 of the forward contactor 30 by actuation of the master switch 24. If the sliding contact 33 on the speed control potentiometer is moved to a high-speed position on the resistance element 63 of the speed control potentiometer 34, the movable stator segment 6 will continue to be rotated towards full alignment with the fixed stator segment 7 by the actuator 11, so that the arm 37 projecting from the movable stator segment 6 will continue to drive the movable contact 36 of the override limit switch 35 until it engages the disconnect contact 47, opening its normally closed relation with the override contact 41. With the override contact 41 opened, the master switch disconnect relay 43 is deenergized so that its normally open contacts 44, 45 can return to their normally open condition completely disabling the master switch, 24.

If the operator were to move the sliding contact 33 on the speed control potentiometer 34 gradually toward the zero speed (zero torque) position, the control signal from the output 65 of the summing circuit operational amplifier 54 would cause the actuator 11 to drive the movable stator 6 gradually back toward the position shown in the drawings, so that in due course rotation of the rotor 2 would stop. Meanwhile, as the arm 37 on the movable stator segment 6 sweeps down sufficiently to allow the disconnect contact 47 of the overriding limit switch to return to its closed position on the override contact 41, the disconnect relay 43 is energized, closing both contacts 44 and 45 to restore control of the master switch 24 over the reversing power line contacts 16 in the forward and reverse contactors 30 and 28. When the operator moves the sliding contact 33 on the speed control potentiometer 34 to the zero speed position, the movable contact 23 of the master switch 24, which is ganged with the sliding contact 33 is moved to its normally open position, causing the coil 29 of the forward contactor 30 to deenergize, thus dropping out the forward power line contacts 17, and the two normally open control contacts 40 and 49 while closing the normally closed control contact 31. If the operator then moved the sliding contact 33 into the reverse direction, the movable contact 23 of the master switch would then be driven into contact with the reverse fixed contact 26 so as to energize the reverse contactor 28 to begin driving the motor 1 in the reverse direction in the same fashion as described for a forward motion.

When the sliding contact 33 of the speed control potentiometer 34 and the movable contact 23 of the master switch 24 are moved in the reverse direction, the movable contact 23 will engage the reverse stationary contact 26 of the master switch 24 completing a circuit through the normally closed contact 31 of the forward contactor 30 to energize the coil 32 of the reverse contactor 28 and thus pick up the reverse power line contact 18 to energize the stator 5 of the motor in the reverse phase relationship. As the operator moves the sliding contact 33 on the speed control potentiometer 34 toward the full speed, full torque reverse position, the control signal from the output 65 of the summing amplifier 54 will cause the actuator 11 to drive the movable stator segment 6 toward phase alignment with the stationary stator segment 7 to recycle the sequence of switching in the control circuit described in connection with the forward drive, except that the circuit will be completed through the normally open and now closed contacts 39 and 48 of the reverse contactor 28, rather than through the corresponding contacts 40 and 49 of the forward contactor 30 ad described above.

The advantages of the invention are apparent. When the operator moves the sliding contact 33 on the speed control potentiometer and the movable contact 23 on the master switch 24 abruptly from full speed forward into the reverse position—an operation that is called "plugging"—the motor 1 is not immediately reversed, but instead is decelerated into a predetermined segment of its torque curve and then reversed. When the movable stator segment 6 is in the full speed, full torque position so as to be in phase alignment with the fixed stator segment 7, whether the motor is operating in its reverse or forward direction, the arm 37 on the movable stator segment 6 drives the movable contact 36 of the override limit switch 35 against the overlapped contacts 46 and 47 and disconnects the contacts 46 and 47 from the override contact 41. Under those conditions, the master switch disconnect relay 43 is deenergized and its two contacts 44 and 45 are in their normally open position so that the master switch 24 has no control over the forward and reverse contactors 28 and 30. Thus when the operator plugs the master switch 24 and immediately restores it to the original position, the motor 1 is not reversed, but might manifest a slight deceleration or decrease in torque as a result of the action of the summing circuit operational amplifier 54 comparing the command signal and the feedback signal. While the master switch disconnect contacts 44 and 45 are open disconnecting the master switch 24, either the forward holding contacts 40 or the reverse holding contacts 39 of the forward contactor or the reverse contactor 28, respectively, will be closed, depending upon the direction of rotation of the motor 1 and this will hold the contactor 28 or 30 that is energized in the energized state.

If the operator rapidly plugs the control handle 66 from full speed in one direction to the opposite direction, the control signal from the output 65 of the summing circuit operational amplifier 54 will reject that command by directing the actuator 11 to rotate the movable stator segment 6 back toward the null phase position as shown in the drawing, but no change can occur in the forward or reverse contactors 30 or 28, respectively, until the movable stator segment 6 has been rotated far enough that the arm 37 lowers the movable contact 36 of the overriding limit switch 35 sufficiently to allow the override contact 41 to return to its closed position thus energizing the disconnect relay 43 to restore the control of the master switch 24 over the forward and reverse contactors 30 and 28, respectively. When control by the master switch 24 is restored, then the direction of the motor 1 rotation can be reversed by deenergizing the forward or reverse contactor 30 or 28, respectively, and energizing the reverse or forward contactor 28 or 30, respectively. Thus reversing can occur only within predetermined segment of the torque curve of the motor 1, and the predetermined segment is readily defined by the setting and structure of the particular override limit switch 35 used. Thus control of the load is never lost and freewheeling as might occur when the motor 1 is in the null phase relationship as shown in the drawings does not occur. Also, if desired, the overriding limit switch 35 may be adjusted so that the motor 1 is prevented from reversing when the torque generated by the motor 1 is so great so as to cause an unacceptably large shock to the motor 1, to protect the motor 1 from both mechanical damage and electrical overload.

The terms "forward" and "reverse" in this context are entirely arbitrary and serve only to distinguish two states of the circuit and motor 1 rotation. In many applications the addition of more elaborate speed controls may be desirable, since the feedback control system shown here is essentially a torque feedback and may or may not reflect actual motor 1 speed. Many variations and refinements of the embodiment disclosed here may of course be made to construct other embodiments better suited for specific applications. The embodiment shown here reflects the best mode presently contemplated by the inventors for carrying out their invention, and it is disclosed in detail here so that those skilled in the art may learn how to practice this invention. Hence, the subject matter regarded as the invention is not defined by the foregoing disclosure, but is particularly pointed out and distinctly claimed in the claims that follow.

We claim:

1. A motor control for a reversible dual stator motor comprising the combination of
   a motor having a rotor and a stator with two segments mounted for relative rotatable adjustment between relative positions inducing opposing voltages in said rotor to relative positions inducing aiding voltages in said rotor;
   a three phase power source connected to energize said stator;
   reversing contacts between said three phase source and said stator to reverse the phase of the power to said stator;
   a master switch actuatable by an operator to control said reversing contacts;
   and an override switch responsive to the relative positions of said stator segments to isolate said master switch from control of said reversing contacts when said stator segments are in a predetermined range of relative positions.

2. A motor control as set forth in claim 1 wherein
   at least one of said two segments of said stator is mounted for limited rotational movement to effect said relative rotatable adjustment;
   and an actuator is connected to said one of said two segments of sad stator to relatively rotatably adjust said stator segments.

3. A motor control as set forth in claim 2 wherein
   a variable command signal source is controlled by an operator to emit a command signal proportional to a desired motor speed and is connected to provide a control signal to control said actuator.

4. A motor control as set forth in claim 3 wherein
   a feedback control system includes said variable command signal source, a feedback signal source coupled to said one stator segment to emit a feedback signal proportional to said relative rotatable adjustment, and a summing circuit connected to receive said command signal and said feedback signal and adapted to emit a control signal proportional to an algebraic sum of said command signal and said feedback signal and connected to transmit said control signal to said actuator to control said actuator.

5. A motor control for a reversible dual stator motor comprising the combination of a three phase AC source;

a reversible motor having a stator to be energized by said three phase AC source, and a rotor, said stator having two stator segments mounted to be relatively rotatably adjustable;

reversing contacts connected between said three phase AC source and said stator;

an actuator to relatively rotatably adjust said stator segments to relative positions responsive to an electrical control signal;

a control handle movable by an operator to different positions corresponding to the desired direction of motor operation and speed of motor operation;

a feedback control system including a variable command signal source responsive to said control member to emit an electrical command signal proportional to desired motor speed, a variable feedback signal source responsive to relative stator position to emit an electrical feedback signal proportional to a relative stator position, and a summing circuit connected to receive said electrical command signal and said electrical feedback signal and adapted to transmit said electrical control signal proportional to an algebraic sum of said electrical command and feedback signals to said actuator;

and a reversing control system including a master switch actuatable by an operator to control said reversing contacts, an override switch actuatable by said relative positions of said stator segments to override said master switch throughout a predetermined range of relative rotatable adjustment of said stator segments.

6. A motor control for a reversible dual stator motor as set forth in claim 5 wherein said override switch has a normally closed override contact connected to control a master switch relay with contacts connected between said master switch and said reversing contacts;

said override switch has a normally open overlap contact connected to hold said reversing contacts in position when said overlap contacts are closed;

and said override switch has a normally open disconnect contact connected to open said override contact after said overlap contact is closed and to disconnect said control member from said variable command signal source.

7. A reversing motor control system for a dual stator AC motor comprising the combination of a motor having a rotor and a stator, said stator including two relatively rotatably adjustable stator segments;

a three phase AC source;

reversing contacts connecting said three phase AC source to said stator of said motor and adapted to reverse the phases from said source to said stator;

an actuator mechanically connected to said stator to relatively rotatably adjust said two relatively rotatably adjustable stator segments, and being responsive to an electrical control signal;

a control handle movable to reflect a desired operation of said motor, connected to a variable signal source to produce a command signal proportional to desired motor speed, and connected to actuate a master switch to control said reversing contacts;

a feedback signal source coupled to said relatively rotatably adjustable stator segments and to a variable signal source to produce a feedback signal proportional to the relative adjustment of said relatively rotatably adjustable stator segments;

a summing circuit having inputs connected to receive said command signal and said feedback signal, adapted to produce said control signal proportional to any difference between said command signal and said feedback signal and having an output connected to said actuator to transmit said control signal to said actuator;

and an override switch actuatable by said relatively rotatable adjustment of said relatively rotatably adjustable stator segments to make-and-break circuits between said master switch and said reversing contacts and between said variable signal source producing said command signal and said summing circuit when said relatively rotatably adjustable stator segments are with a predetermined range of relative rotatable adjustment.

8. A reversing motor control system as set forth in claim 6 wherein at least one stator segment of said two relatively rotatably adjustable stator segments is mounted for limited rotational movement to effect a relative rotational adjustment of said two segments;

said actuator is a rotary actuator mechanically coupled to said one stator segment to impart limited rotational movement thereto responsive to said electrical control signal.

9. A reversing motor control system as set forth in claim 6 wherein a forward contactor and a reverse contactor have separate coils energizable to actuate separate sets of contacts including said reversing contacts;

said master switch is connected between a current source and each of said coils of each of said contactors;

a master switch disconnect relay has a coil, a first set of contacts actuatable by said coil and connected between said master switch and said coil of said forward contactor, and a second set of contacts actuatable by said coil and connected between said master switch and said coil of said reverse contactor;

and said override switch is a limit switch having contacts connected between said coil of said master switch disconnect relay and an energizing source to disconnect said master switch from said coils of said forward and reverse contactors throughout a predetermined range of said relative rotational adjustment of said stator segments.

PO-1050
(5/69)

UNITED STATES PATENT OFFICE
CERTIFICATE OF CORRECTION

Patent No. 3,581,169          Dated May 25, 1971

Inventor(s) Calud, Romeo T., Hansbrough, David L. & Zaumseil, Dean R.

It is certified that error appears in the above-identified patent and that said Letters Patent are hereby corrected as shown below:

| | |
|---|---|
| Column 2, line 39, | after "rotation" delete "set" and insert --of-- |
| Column 2, line 71, | "45" should read --44-- |
| Column 3, line 2, | after "connected" insert --to a common ground return. The reverse fixed contact 26 is also connected-- |
| Column 3, line 15, | after "stator" insert --6-- |
| Column 3, line 38, | "of" should read --on-- |
| Column 3, line 40, | "bottom" should read --button-- |
| Column 4, line 5, | after "of" insert --the-- |
| Column 4, line 9, | "bottom" should read --button-- |
| Column 4, line 35, | "common" should read --command-- |
| Column 5, line 36, | after "closed" insert --control-- |
| Column 5, line 39, | "ad" should read --as-- |
| Column 5, line 74, | "reject" should read --reflect-- |
| Column 6, line 13, | after "within" insert --a-- |
| Column 6, line 65, | "sad" should read --said-- |
| Column 7, line 27, | delete "a" (1st occurrence) |

Signed and sealed this 7th day of December 1971.

(SEAL)
Attest:

EDWARD M. FLETCHER, JR.        ROBERT GOTTSCHALK
Attesting Officer               Acting Commissioner of Patents